United States Patent [19]

Rönbeck

[11] 3,902,606

[45] Sept. 2, 1975

[54] HANDLING APPARATUS

[75] Inventor: Arne Ingbert Rönbeck, Olofstrom, Sweden

[73] Assignee: AB Volvo, Goteborg, Sweden

[22] Filed: Aug. 19, 1974

[21] Appl. No.: 498,703

[30] Foreign Application Priority Data

Aug. 23, 1973 Sweden............................ 7311487

[52] U.S. Cl............................ 214/1 BV; 214/147 T
[51] Int. Cl.............................................. B23q 7/04
[58] Field of Search.. 214/1 BC, 1 BD, 1 BV, 1 BH, 214/147 T, 8.5 D

[56] References Cited
UNITED STATES PATENTS 3,061,118  10/1962  Halberstadt...................... 214/8.5 A
3,127,026  3/1964   Blatt................................. 214/1 BD

*Primary Examiner*—Robert J. Spar
*Assistant Examiner*—George F. Abraham
*Attorney, Agent, or Firm*—Young & Thompson

[57] ABSTRACT

A handling apparatus having gripping means for moving sheet metal plates out of or into a press in a short vertical and adjacent long horizontal movement. The gripping means are attached to the lower end of a rod pivoted at its centre to a oscillating crank arm and having its upper end guided in a cam path consisting of a vertical portion, the extension of which intersects the crank axis, and a circle-arc portion on at least one side of the lower end of the vertical portion. When the cam path comprises two circle-arc portions a switching mechanism guides the upper rod end into the desired arc portion.

8 Claims, 6 Drawing Figures

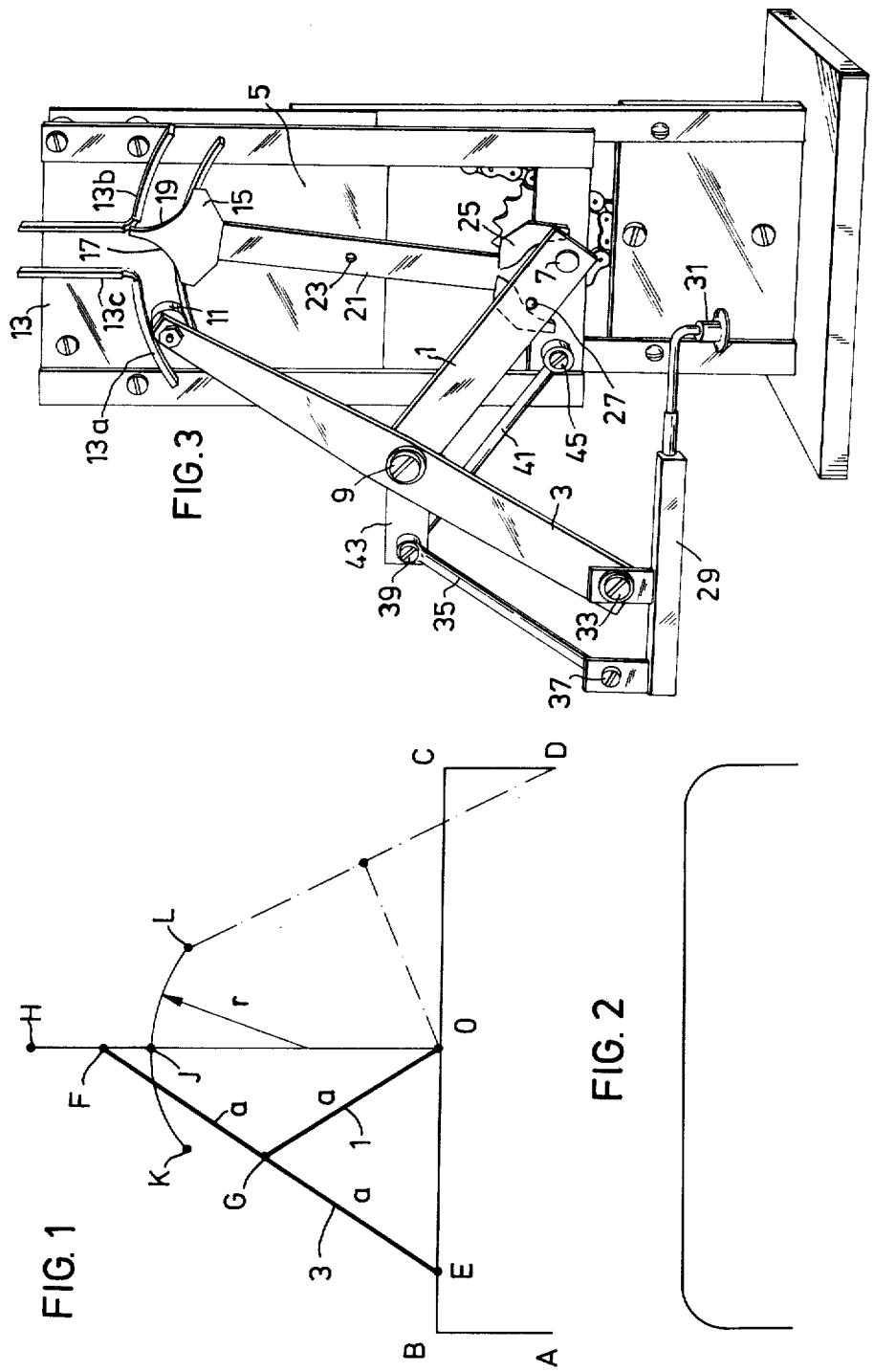

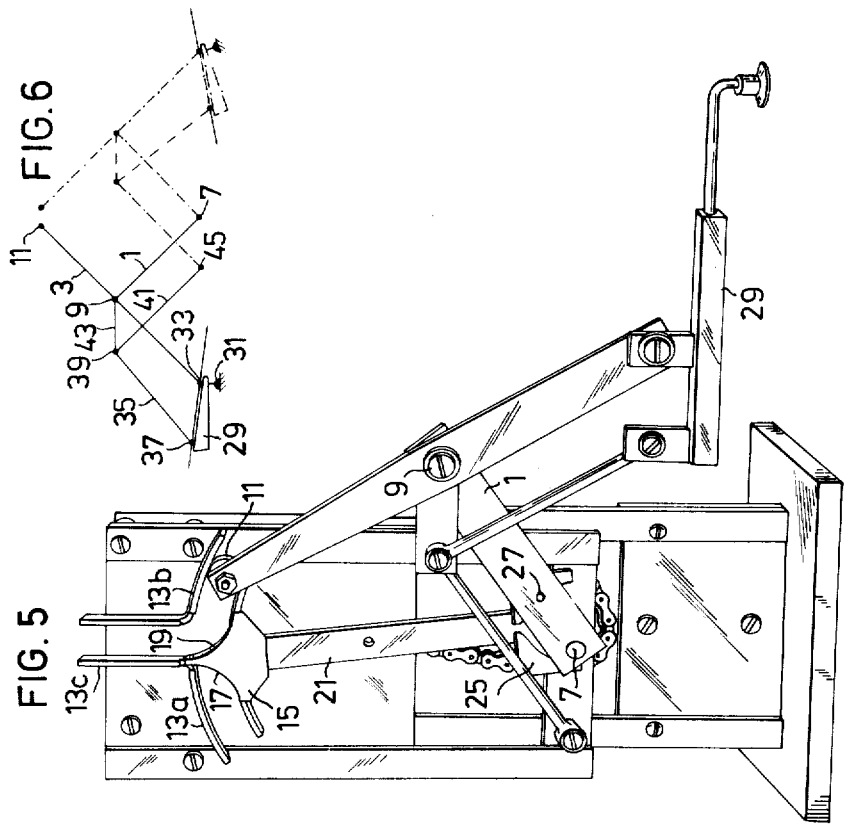
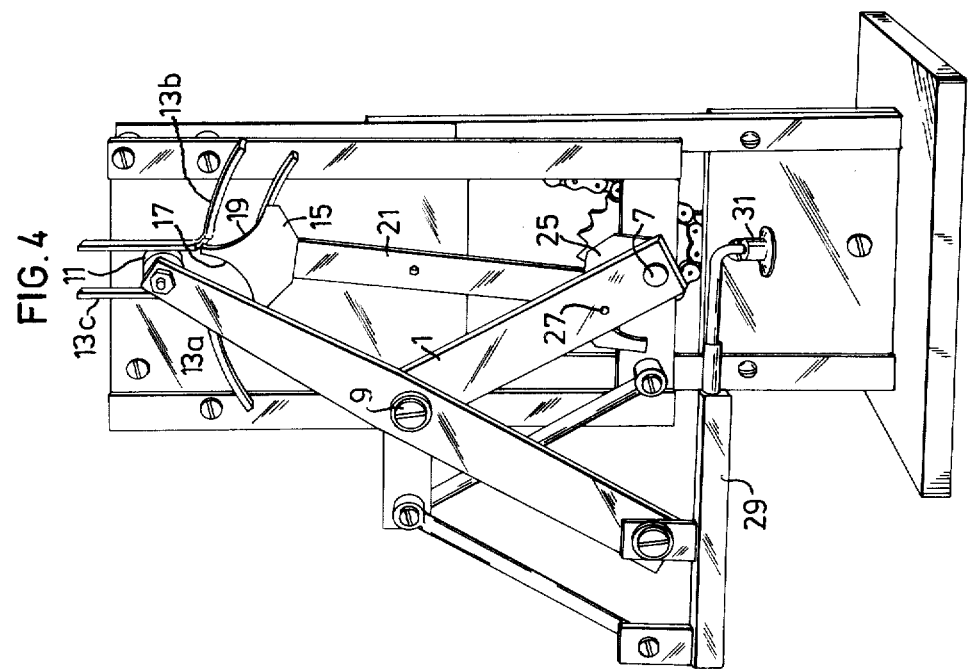

HANDLING APPARATUS

The present invention relates to a handling apparatus for reciprocatingly moving a working member in a substantially rectilinear, relatively long first movement path and in a substantially rectilinear, relatively short second movement path which is connected to and is normal to said first movement path, said apparatus being particularly intended as a feed apparatus arranged to effect a horizontal feed movement and a vertical raising and lowering movement, wherein said working member is mounted on a first end of a rod, the other end of which is guided by guide means to follow a predetermined movement path when said rod is driven by a reciprocatingly pivotable crank arm which is pivotally connected to said rod centrally between the ends thereof.

More particularly the invention pertains to an apparatus for feeding sheet-metal objects or workpieces into and out of a press, for example an apparatus intended for transferring pressed objects from one press to another via a conveyor belt or some other appropriate form of object transferring device for the continued pressing said object. When transferring the object or workpiece from one press to another, the workpiece is first lifted vertically out of the press tool and moved laterally out of the press and placed onto a conveyor device which moves the workpiece to an infeed position adjacent the next press in line, the press-feed mechanism of which press is then caused to lift said workpiece and to move it laterally into said press and then to lower it onto the press tool. Each press in a press line (in which there may be from three to six presses) suitably has an infeed apparatus arranged on the front side thereof and an outfeed apparatus arranged on the rear side thereof. It is of great importance that the lifting movements, and particularly the lowering movements effected by the apparatus take place vertically in a straight line so that the workpiece is correctly positioned on its respective tool, even when tools of varying vertical dimensions are used because of changed operational functions thereof. It is also important that lateral movement of the workpiece is effected in a substantially straight horizontal line, since the available vertical space in the presses is limited.

A handling apparatus of the type envisaged is known from the U.S. Pat. No. 3,061,118. The known apparatus, however, does not satisfactorily fulfil the aforesaid requirements. The main disadvantage with the known apparatus is that the lowering movement effected by said apparatus when placing a workpiece in the press does not take place vertically in a straight line, but in a curved path. Neither is the lateral movement of the workpiece effected rectilinearly with the known apparatus.

An object of the invention is to eliminate at least some of the disadvantages possessed by said apparatus and to modify the handling apparatus described in the introduction so that rectilinear movements can be obtained.

This object is obtained with a handling apparatus which is characterized in that the geometric extension of the pivot axis of the crank arm intersects the path travelled by said first end of said rod during the movement of said end along said first movement path, the length of said arm being half the length of the rod, in that the path travelled by said other end of said rod during movement of said first end along said first movement path is a straight line which extends normal to the movement path of said first rod end and the extension of which intersects the axis of the crank arm, and in that the path travelled by said other end of said rod during movement of said first rod end along said second movement path is substantially circle-arcuate in shape, the centre of which circle lies on said extension of said straight line.

Preferably, the handling apparatus shall provide an elongate composite movement path having at the beginning and at the end of said path right-angled movement components. This is achieved with an apparatus which is characterized in that the movement path of said other end of said rod includes an extension to said circle-arcuate path which is located on the opposite side of said straight line path, and in that the guide means comprises a switching device which, in operation, upon passage of said first rod end from said first to said second or to said third movement path guides the other end of the rod to the circle-arcuate path which is located on the same side of the extension to the straight line movement path as the first end of the rod having the working member attached thereto.

In accordance with one embodiment of the invention, the guide means for the other end of the rod has the form of a cam path in which a guide element attached to the rod is arranged to move.

It is also desirable to avoid abrupt junctions between the different directions of movement of the working member. This may be achieved by joining the mutually right-angled movement paths by means of an arcuate junction. In the embodiment described above this is obtained in a simple manner by using a roller as the guide element of said rod which, in operation, runs in the curved path, thereby rounding off the junction between the first and the second and third movement paths respectively of the working member. The radius of the curved junction can be determined by selection of the diameter of the roller.

In accordance with a further embodiment of the invention, when said other end of the rod is guided in a cam path, a simple and reliable construction may be obtained when said switching device comprises a guide body which is arranged for movement in said cam path and which has two converging guide surfaces of substantially circle-arcuate configuration, said guide body being arranged for movement between a first position in which a first of said guide surfaces forms a connection between one circle-arcuate portion of the cam path and the straight line portion thereof and a second position in which the second of said guide surfaces forms a connection between the other circle-arcuate portion of the cam path and said straight line portion, especially if the guide body is mounted to one end of an arm which is pivotally mounted between its ends, the other end of said arm being activated by the crack arm for switching the position of the guide body as the crank arm passes the position in which it is parallel with the rod.

So that the invention may be more readily understood and further features thereof made apparent, embodiments of the invention will now be described with reference to the accompanying drawings, in which:

FIG. 1 is a graphic presentation of the major parts of the handling apparatus and the movement paths travelled by said rod, FIG. 2 shows a preferred movement path travelled by the working member, FIGS. 3–5 show an embodiment of the handling apparatus according to the invention in a first end position, an intermediate position and in a second end position, and FIG. 6 is a schematic view of a modification of the embodiment according to FIGS. 3–5.

In accordance with the invention, the handling apparatus causes a working member to move reciprocatingly along a path ABOCD, FIG. 1. With the illustrated apparatus, a workpiece is engaged by the apparatus in position A, is lifted to position B, from where it is moved laterally along path BOC into a press for example, whereafter the workpiece is lowered to position D, to be placed in the press tool. The gripping means used to engage the workpiece are then returned to the position A and the process is repeated. When using the apparatus for removing a workpiece from the press, the gripping means commences its operation at the position B and passes, via position C, to position D, where it retrieves the workpiece from the press tool and moves the workpiece to position A, via position C and position B, at which position A it releases the workpiece and returns to position B.

The apparatus comprises a crank arm 1 capable of pivoting around an axis O extending perpendicularly to the plane of the drawing. The crank arm has a length a and the outer end of said arm is pivotally connected to the centre point G of a rod 3 having a length 2a. A first end E of the rod 3 is arranged to carry a working member (not shown in FIG. 1), such as said gripping means for example. The other, or second, end F of the rod 3 is caused to follow a certain path of travel during rotation of the crank arm.

For the horizontal movement of the first end E of rod 3 along path BOC, the other end F of the rod is caused to move reciprocatingly in a vertical path JH, the geometric extension of which intersects the axis O. If it is assumed, as viewed in FIG. 1, that the crank arm is swung clockwise from the position shown in full lines, said other end F of rod 3 will move upwardly along path JH and reach position H, at the same time as the first end E of rod 3 passes the axis O. The other end F of rod 3 then moves downwardly to reach point J simultaneously as the first end E of rod 3 reaches the point C. The other end F of rod E is then caused to follow a curved movement path JL, the first end E moving rectilinearly and vertically along path CD, to the position shown in ghost lines. It has been found that the movement path JL can be approximated, with good results, with a circle-arc of radius r, the centre of which arc lies on the extension of movement path JH to axis O. The radius r is dependent on the relationship between the length a of crank arm 1 and the length of the movement path BOC.

When the crank arm 1 has reached the position shown in ghost lines in FIG. 1, its direction of movement is switched. The other end F of rod 3 is forced to follow the movement path LJHJ, whereby the first end E of rod 3 is caused to move along movement path DCOB. By means of a switching device (not shown in FIG. 1) the other end F of rod 3 is now caused to move into and to follow a second curve movement path JK which is symmetrical with movement path JL. The first end E of rod 3 then moves vertically downwards to position A.

By means of the schematically illustrated handling apparatus of FIG. 1 it is possible to move a working member rapidly along path ABCD and back again. Although the movement of the working member is harmonic, there are abrupt changes in direction of movement at points B and C. To avoid these abrupt changes, the junctions between the vertical and horizontal movement paths may be rounded, so that the combined movement paths obtain the general configuration shown in FIG. 2.

In accordance with one embodiment of the invention, the movement path illustrated in FIG. 2 can be obtained by providing said other end of rod 3 with a roller which is arranged to move in a cam path. The diameter of the roller determines the radius of the curved portions of said movement path. This embodiment is illustrated in FIGS. 3–5, which show the apparatus, with the first end E of rod 3 in position A, in the position shown in full lines in FIG. 1, and in position D. The curved portions of the travel path can also be produced by modifying the path of movement of said other end F of rod 3.

With the apparatus shown in FIG. 3, the crank arm 1, is capable of pivoting around an axis pin 7 journalled in a frame plate 5, while the outer end of said arm is pivotally connected to the rod 3 by means of a peg 9 mounted to said rod centrally between the ends thereof. The upper end of rod 3 carries a roller 11 which is arranged to move in a cam path 13 having the form of two circle-arc portions 13a, 13b and a vertical portion 13c extending vertically upwards centrally of said circle-arc portions.

The curved path 13 has located centrally beneath the vertical portion 13c a guide body 15 which forms part of a switching device, said body 15 having two upwardly converging guide surfaces 17, 19, each of which may be circle-arcuate in shape, for example. The guide body 15 is mounted on the upper end of a double-arm lever 21 capable of pivoting around a peg 23 attached to the frame plate 5 and located between the ends of said lever. The lower end of the arm 21 has the form of a bifurcate structure 25 which co-acts with a pin 27 on the crank arm 1.

In the position shown in FIG. 3, the pin 27 lies against the left leg of the fork 25 and has moved said leg to the left as seen in the Figure, whereby the guide body 15 has been swung to its right-hand position in which the guide surface 17 completes the junction between the cam paths 13a and 13c. When the crank arm 1 swings clockwise, the roller 11 moves up in the cam path 13c, as shown in FIG. 4. Upon continued pivoting movement of the crank arm, the roller 11, subsequent to turning, again moves in the cam path 13c and into the cam path 13b. This is accomplished owing to the fact that, when the crank arm passes its vertical position, the pin 27 on said crank arm entrains the bifurcate structure 25 and now bears against its right-hand leg, the guide body 15 being moved to its left-hand position in which the guide surface 19 completes the junction between the cam paths 13c and 13b. This position is shown in FIG. 5, in which position the roller 11 has moved out into the cam path 13b.

In order to maintain the working member mounted on the lower end of rod 3 correctly oriented and to ensure that a solely translatory movement thereof is carried out, the handling apparatus is provided with a parallelogram link guide means. The working member 29, which with the illustrated embodiment is provided with a suction cup 31 for lifting the workpiece (the press object), is arranged for pivoting movement around a peg 33 mounted to the lower end of rod 3 (FIG. 3). The working member 29 is also pivotally connected with a link 35 which extends parallel with the rod 3, by means of a peg 37 located on the same level as the peg 33.

The upper end of link 35 is pivotally connected by means of a peg 39 with the upper end of a link 41 extending parallel with the crank arm. The peg 39 is held, by means of a horizontal link 43, on the same level as the peg 9 and at the same distance from said peg as the distance between the pegs 33 and 37. The lower end of link 41 is also pivotally mounted by means of a peg 45, to the frame 5 at a distance from the axis 7 equal to the distance between pegs 33 and 37 and on the same level as said axis.

The invention is not restricted to the described and illustrated embodiment shown in FIGS. 3–5, but can be modified within the scope of the claims. Since the upper end of the rod is substantially to follow a simple arc, the means for positively guiding said end may have the form of a crank arm.

In certain cases, the workpiece placed in the press tool shall be inclined relative to the plane of the infeed position. This can be provided for by arranging that the rear attachment of the working member 29 for the peg 37 is adjustable along the working member so that the distance between the pegs 33 and 37 can be made shorter or longer than the distance between the pegs 9 and 39. An example of this is shown schematically in FIG. 6, where the distance between the pegs 33 and 37 adjacent the working member 29 is greater than the distance between the pegs 9 and 39. The pegs 33 and 37 will therefore not lie in the same horizontal plane in the end positions of the handling apparatus movement paths but will give the working member an inclined position. In the end position A shown with full lines in FIG. 6, this has been compensated by giving the working member 29 a wedge shape so that the position of the workpiece is horizontal. Alternatively, provision can be made for changing the length of link 35 for example. In the end position D shown in ghost lines, the workpiece on the other hand, will be inclined to the horizontal plane upwardly towards the right of FIG. 6.

If the distance between pegs 33 and 37 is adjusted shorter than the distance between pegs 9–39 the working member 29 in end positions A and D will instead be inclined in the opposite direction to that shown in FIG. 6.

The inclined position of the working member is caused mainly during the movement between the positions B and C whilst the lifting and lowering movements are still effected in practically vertical direction.

What I claim is:

1. A handling apparatus for reciprocatingly moving a working member (29) in a substantially rectilinear, relatively long first movement path (BC) and in a substantially rectilinear, relatively short second movement path (CD) which is connected to and is normal to said first movement path, said apparatus being particularly intended as a feed apparatus arranged to effect a horizontal feed movement and a vertical raising and lowering movement, wherein said working member (29) is mounted on a first end (E) of a rod (3), the other end (F) of which is guided by guide means (13) mounted on a support to follow a predetermined movement path (KJHJL) when said rod is driven by a oscillatingly pivotable crank arm (1) which is pivotally connected at one end to said rod centrally between the ends thereof, the other end of the crank arm being mounted on the support and characterized in that the geometric extension of the pivot axis (O) of the crank arm (1) intersects the path (BC) travelled by said first end (E) of said rod (3) during the movement of said end along said first movement path, the length (a) of said arm (1) being half the length (2a) of the rod (3); in that the path travelled by said other (F) end of said rod (3) during a portion of the movement of said first end (E) along said first movement path (BC) is a straight line (JFH) which extends normal to the movement path (BC) of said first rod end (E) and the extension of which intersects the axis (O) of the crank arm (1): and in that the path (JL) travelled by said other end (F) of said rod (3) during movement of said first rod end (E) along said second movement path (CD) is substantially circle-arcuate in shape, the centre of which circle lies on said extension of said straight line (JH).

2. An apparatus according to claim 1, with which the working member (29) is also to be moved in a third movement path (BA) which is parallel with said second movement path (CD) and which is located at the opposite end of said first movement path (BC) to said second movement path, characterized in that the movement path of said other end (F) of said rod (3) includes an extension (KH) to said circle-arcuate path (JL) which is located on the opposite side of said straight line path (JH); and in that the guide means comprises a switching device (15–27) mounted on said support and which, in operation, upon passage of said first rod end (E) from said first (BC) to said second or to said third movement path (CD,BA) guides the other end (F) of the rod (3) to the circle-arcuate path (JL,KJ) which is located on the same side of the extension to the straight-line movement path (JH) that the first end (E) of the rod (3) having the working member (29) attached thereto is located.

3. An apparatus according to claim 2, characterized in that the guide means for said other end (F) of said rod (3) is mounted on said support and has the form of a cam path (13) in which a guide element (11) secured to the rod is arranged to move.

4. An apparatus according to claim 3, characterized in that said guide element has the form of a roller (11) arranged to move in said cam path so as to provide a curved junction between said first (BC) and said second and said third movement path (CD,BA), respectively, travelled by said working member (29), the radius of said junction being variable by selection of the diameter of said roller.

5. An apparatus according to claim 3, characterized in that said switching device comprises a guide body (15) which is arranged for movement in said cam path (13) and which has two converging guide surfaces (17,19) of substantially circle-arcuate configuration, said guide body being arranged for movement between a first position (FIG. 3) in which a first (17) of said guide surfaces forms a connection between one circle-arcuate portion (13a) of the cam path and the straight line portion (13c) thereof and a second position (FIG. 5) in which the second (19) of said guide surfaces forms a connection between the other circle-arcuate portion (13b) of the cam path and said straight line portion (13c).

6. An apparatus according to claim 5, characterized in that the guide body (15) is mounted to one end of an arm (21) which is pivotally mounted (23) between its ends, the other end (25) of said arm being activated by the crank arm (1) for switching the position of the guide body (15) as the crank arm (1) passes the position in which it is parallel with the rod (3).

7. An apparatus according to claim 1, characterized by a parallelogram link mechanism which is coacting with the support, the arm and the rod to effect a purely translatory movement of the working member (29).

8. An apparatus according to claim 7, characterized in that the length of at least one (29) of the links in said link mechanism is adjustable to enable controlled deviation of the working member (29) from a purely translatory movement thereof.

* * * * *

REEXAMINATION CERTIFICATE (75th)

United States Patent [19]
Rönbeck

[11] B1 3,902,606
[45] Certificate Issued Apr. 19, 1983

[54] HANDLING APPARATUS

[75] Inventor: Arne Ingbert Rönbeck, Olofstrom, Sweden

[73] Assignee: AB Volvo, Goteborg, Sweden

Reexamination Request
No. 90/000,262, Sep. 28, 1982

Reexamination Certificate for:
Patent No.: 3,902,606
Issued: Sep. 2, 1975
Appl. No.: 498,703
Filed: Aug. 19, 1974

[30] Foreign Application Priority Data

Aug. 23, 1973 Sweden .................... 7311487

[51] Int. Cl.³ .............................. B23Q 7/04
[52] U.S. Cl. ..................... 414/733; 414/737
[58] Field of Search ... 414/733, 737, 749, 752; 198/488

[56] References Cited

U.S. PATENT DOCUMENTS

| | | |
|---|---|---|
| 1,766,573 | 6/1930 | Westin. |
| 1,959,512 | 5/1934 | Wall et al. |
| 2,496,000 | 1/1950 | Bugenhagen. |
| 2,948,417 | 8/1960 | Haanes. |
| 3,127,026 | 3/1964 | Blatt. |
| 3,501,120 | 3/1970 | Daniel, Jr. |

FOREIGN PATENT DOCUMENTS

| | | |
|---|---|---|
| 562338 | 6/1944 | United Kingdom. |
| 46-34158 | 10/1971 | Japan. |

*Primary Examiner*—L. J. Paperner

[57] ABSTRACT

A handling apparatus having gripping means for moving sheet metal plates out of or into a press in a short vertical and adjacent long horizontal movement. The gripping means are attached to the lower end of a rod pivoted at its centre to a oscillating crank arm and having its upper end guided in a cam path consisting of a vertical portion, the extension of which intersects the crank axis, and a circle-arc portion on at least one side of the lower end of the vertical portion. When the cam path comprises two circle-arc portions a switching mechanism guides the upper rod end into the desired arc portion.

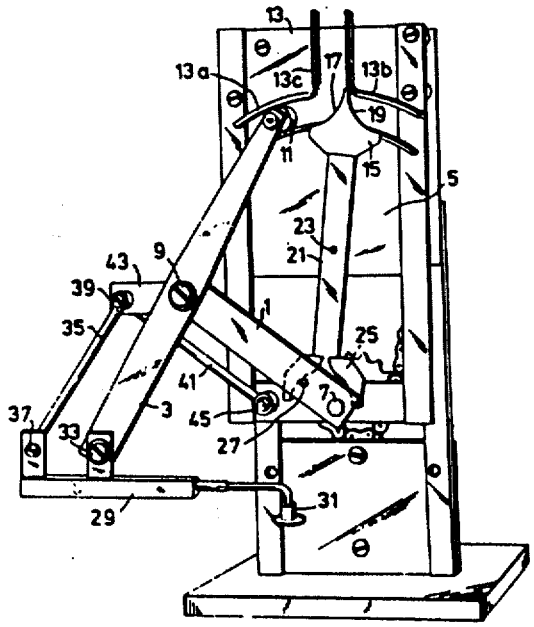

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1–8 is confirmed.

* * * * *